(12) United States Patent
Amico

(10) Patent No.: US 11,908,172 B2
(45) Date of Patent: Feb. 20, 2024

(54) METHODS AND SYSTEMS TO REDUCE PRIVACY INVASION AND METHODS AND SYSTEMS TO THWART SAME

(71) Applicant: Privacy4Cars, LLC, Kennesaw, GA (US)

(72) Inventor: Andrea Amico, Kennesaw, GA (US)

(73) Assignee: Privacy4Cars, LLC, Kennesaw, GA (US)

(*) Notice: Subject to any disclaimer, the term of this patent is extended or adjusted under 35 U.S.C. 154(b) by 36 days.

(21) Appl. No.: 17/383,218

(22) Filed: Jul. 22, 2021

(65) Prior Publication Data

US 2022/0058424 A1  Feb. 24, 2022

Related U.S. Application Data

(60) Provisional application No. 63/067,543, filed on Aug. 19, 2020.

(51) Int. Cl.
| | | |
|---|---|---|
| *G06V 40/00* | (2022.01) | |
| *G06V 10/44* | (2022.01) | |
| *G06V 10/42* | (2022.01) | |
| *G06V 10/56* | (2022.01) | |
| *G06V 40/10* | (2022.01) | |
| *G06F 18/22* | (2023.01) | |
| *G06F 18/211* | (2023.01) | |
| *G06V 20/62* | (2022.01) | |

(52) U.S. Cl.
CPC .......... *G06V 10/443* (2022.01); *G06F 18/211* (2023.01); *G06F 18/22* (2023.01); *G06V 10/42* (2022.01); *G06V 10/56* (2022.01); *G06V 40/10* (2022.01); *G06V 20/625* (2022.01)

(58) Field of Classification Search
CPC ...... G06V 10/443; G06V 10/42; G06V 10/56; G06V 40/10; G06V 20/625; G06V 30/10; G06V 20/63; G06V 20/62; G06K 9/6201; G06K 9/6228; G06F 21/6254; G06F 21/6245
See application file for complete search history.

(56) References Cited

U.S. PATENT DOCUMENTS

| | | | |
|---|---|---|---|
| 2018/0137620 A1* | 5/2018 | Gatto | G06V 40/40 |
| 2019/0057233 A1* | 2/2019 | Scott | G06V 40/173 |
| 2020/0250405 A1* | 8/2020 | Ming | G06V 40/172 |
| 2021/0042592 A1* | 2/2021 | Hashimoto | G06V 10/764 |
| 2021/0142121 A1* | 5/2021 | Sivakumar | G06V 20/54 |
| 2021/0295080 A1* | 9/2021 | Chen | G06V 10/44 |
| 2021/0300433 A1* | 9/2021 | Vorobeychik | G06V 10/751 |
| 2022/0036114 A1* | 2/2022 | Chigos | G06V 20/52 |

* cited by examiner

*Primary Examiner* — Emily C Terrell
*Assistant Examiner* — Ahmed A Nasher
(74) *Attorney, Agent, or Firm* — Honigman LLP

(57) ABSTRACT

Robust recognition systems to identify potentially identifying information that is contained within a dataset representing a system target are disclosed, together with related method. In an implementations, the systems and methods receive the dataset, identify features in the dataset that have a characteristic indicative of an expected feature, processes the identified features to yield a candidate feature, wherein the candidate feature is one feature contained within the identified features that has the highest probability of containing potentially identifying information.

10 Claims, 1 Drawing Sheet

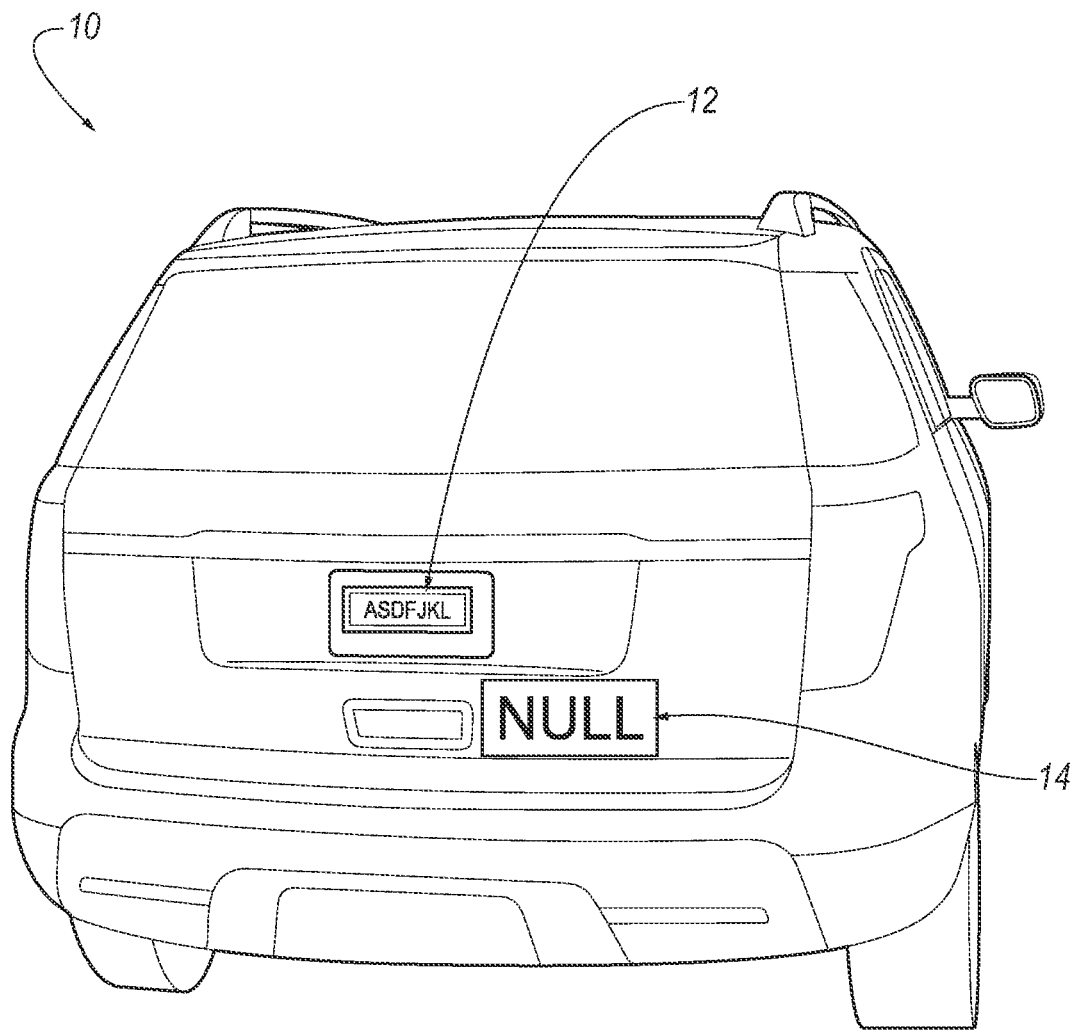

METHODS AND SYSTEMS TO REDUCE PRIVACY INVASION AND METHODS AND SYSTEMS TO THWART SAME

TECHNICAL FIELD

This disclosure relates to reducing invasions of privacy and to preventing same.

BACKGROUND

Cameras, video and image sensors and scanners, and the like are rapidly proliferating, and are increasingly used either in connection with embedded computer vision algorithms or to send footage to be processed by such algorithms. Such technologies facilitate ubiquitous automated recognition systems (e.g., facial recognition, gait recognition, Automated License Plate Readers or ALPRs, and the like) and can be used to surveil and/or profile individuals for governmental purposes (e.g. for law enforcement, intelligence gathering, etc.), for commercial purposes (e.g. to serve ads, to create profiles, to match existing users to third party profiles, etc.) or the like and are often being applied much more broadly and, perhaps nefariously, in a more covert manner than originally intended.

For example, in the context of license plates, such systems were originally introduced to validate, on a one-on-one basis, that a vehicle was properly registered and provided a means to distinguish two similar vehicles from each other. In some implementations, ALPRs were justified as means to increase the capability of law enforcement to solve crimes. Today ALPR systems have not only become ubiquitous and are used by government entities to continuously monitor citizens who are never involved with, or even suspected of a crime; to make things worse, the majority of the ALPR systems installed in the United States and other counties are owned, managed and/or operated by private entities to mine the license plate data to build a dynamic map of where vehicles travel and such entities use that information to micro target consumers. In addition, such devices and technologies can further systemic inequities, e.g. by facilitating the monitoring of target specific classes of persons (e.g. minorities). Consequently, there appears to be a legitimate desire to counteract these and similar technologies to restore the privacy and liberty of citizens in view of the improper use of such systems.

SUMMARY

Robust recognition systems to identify potentially identifying information that is contained within a dataset representing a system target are disclosed, together with related method. In an implementations, the systems and methods receive the dataset, identify features in the dataset that have a characteristic indicative of an expected feature, and process the identified features to yield a candidate feature, wherein the candidate feature is one feature contained within the identified features that has the highest probability of containing potentially identifying information.

DESCRIPTION OF DRAWINGS

FIG. 1 depicts an embodiment of a system and method, in the context of an automated license plate reader, for the prevention of a recognition system from identifying one or more features contained in a dataset that are associated with potentially identifying information.

Like reference symbols in the various drawings indicate like elements.

DETAILED DESCRIPTION

In a broad form, the inventor hereof contemplates (i) systems and methods that prevent recognition systems from identifying one or more features contained in a dataset that are associated with potentially identifying information ("Recognition System Prevention Tools"), and (ii) systems and methods to thwart, or reduce the efficacy of, such Recognition System Prevention Tools ("Recognition System Prevention Tools Thwarter").

In some implementations, the dataset referenced above can be populated by the recognition system and includes information representing a system target. In some implementations, the recognition system is programmed to identify features in a dataset that are likely to be associated with potentially identifying information by comparing features contained in the dataset against features expected by the recognition system, wherein, upon location of features in the dataset that are similar to the features expected by the recognition system, the recognition system seeks to ascertain information associated therewith in an effort to obtain the potentially identifying information.

In some implementations, the Recognition System Prevention Tools comprise a modified system target, or the step of modifying the system target, so that the one or more features associated with the potentially identifying information are populated into the dataset so that they differ from the features expected by the recognition system. In some implementations, the modification may be one or both of physical or digital. For example, (i) a physical modification may include, among other things, changing the underlayment of the system target to change the perceived shape and/or color of the one or more features (e.g., by way of a sticker, decal, painting of the underlayment or the like) and (ii) a digital modification may include, among other things, changing the perceived image collected into the system using digital technologies (e.g., using infrared technology and the like).

In some implementations, the Recognition System Prevention Tools may comprise decoy features or include the provisioning of decoy features on or about the system target so that the dataset representing the system target are similar to one or more features expected by the recognition system. In some implementations, the Recognition System Prevention Tools include both of the features identified above while other implementations may employ at least one of the features. For example, in the context of a method, the method may include both of the steps of: (i) modifying the system target so that the one or more features associated with the potentially identifying information are populated into the dataset so that they differ from the features expected by the system; and (ii) modifying the system target to include decoy features in the dataset representing the system target that are similar to one or more features expected by the system.

As described above, the inventor hereof further contemplates methods and system that may act to prevent, or reducing the efficacy of the kinds of Recognition System Prevention Tools herein described (or Recognition System Prevention Tools Thwarter as defined above or "Thwarter"). In some implementations, and as described above, the recognition system reviews information in a dataset representing a system target. In some implementations, the Thwarter processes that information to (i) identify features therein that that have a characteristic indicative of an expected feature (e.g., without limitation, generally equivalent in size as, or larger than, features expected by the recognition system, similar geometry, or similar color), and (iii) further process such identified features to ascertain any potentially identifying information that may be contained in any such identified features. In other words, in such example, the Thwarter is not only reviewing the dataset for features that are similar to the features expected by the system but it reviewing the dataset for all features that are generally equivalent in size to the features expected by the system or greater than same and then passing those identified features for further processing. It is recognized that there will be scenarios when the Thwarter identifies multiple features for further processing In an implementation, the Thwarter may comprise the step of removing features in the set of the identified features that are likely to be decoy features (and that may contain decoy information.) As an example, the Thwarter may review the features in the set of the identified features to locate potentially identifying information contained therein and/or other characteristics of such identified features and comparing that information and/or such other characteristics against one, some or each of the following: (i) expected characteristics of such information (e.g., the selection and arrangement, the typeset, the spacing, the shape, or other defining characteristics) such that the system may identify something as a decoy features if the characteristics do not align with the expected characteristics, and (ii) information that is known to the system as decoy information (e.g., the system may be programmed, or otherwise learn through AI or the like, that certain decoy information is repeatedly used such that it is likely to be decoy information.)

In another implementation, the Thwarter may comprise the step of identifying features in the set of identified features that contain information and processing that information to reveal whether such information might be potentially identifying information. As just described, the Thwarter may review the features in the set of the identified features to locate potentially identifying information contained therein and comparing that information against information that is more likely to be potentially identifying information. For example, the system may make this determination based on a comparison of such information with information in other features in the set of the identified features and/or the system may make this determination by comparing such information against a set of information that is flagged by the system. For example, the set of information that is flagged by the system may be a list maintained by the system in which the system seeks.

The description in the remainder of this detailed description describes the foregoing methods and systems in the context of methods and systems to prevent (i) license plate recognition systems from identifying a license plate (the features) contained an image of the license plate (the system target and the dataset) that are associated with the license plate number (potentially identifying information), and (ii) tattoo recognition systems from identifying a tattoo (the features) contained in an image of an individual or portions of an individual (the system target and the dataset) that are associated with one or more persons (potentially identifying information). These two examples are but examples of the potential and expansive embodiments and are intended to be merely exemplary in nature such that the incorporation herein are, in no way, intended to limit the invention, its application, or uses. For example, an additional embodiment, which will not be further discussed but is referenced merely to illustrate the expansive nature of the broad concept is facial recognitions (e.g., where the features can be any number of facial features, the system target and the dataset can be at least a portion of a person's face, and the potentially identifying information can be the identity of one or more persons.

License Plate Embodiment

Using automated license plate recognition systems and methods as an example, and without limiting the breadth of the disclosure, an implementation of a recognition system may undertake the following steps: (i) obtaining a frame or sequence of frames (typically because movement is detected) to define a system (or scanned) target and dataset, (ii) identifying features in the system target and data set associated with a rectangular shape of certain proportions (or its homeomorphic transformations), sometimes with also some additional attributes (e.g. must be of a certain color or ranges of colors, must contain letters or numbers, etc.), (iii) creating a bounding box therearound (often with a likelihood of that portion of the image being a plate), (iv) upon creation of the bounding box, the system may employ a mechanism to obtain information associated with the identified features; for example, the system may employ optical character recognition (OCR) or additional object recognition techniques on the image contained in the bounding box to yield the potentially identifying information contained there (i.e., the license plate number).

In an implementation, and as described above, a system and method may be employed to prevent the ALPR system from correctly recognizing and reading the license plate number described in the foregoing paragraph.

With reference to FIG. 1, system 10 may employ a smokescreen 12 that, by way of example, is a device to make the license plate features less recognizable by the ALPR system by changing the features in the system target to be different than what the ALPR system expects. For example, and without limitation, an acrylic adhesive may be applied outside the boundaries of the license plate (without altering the plate in any manner) to change its appearance to a shape other than a rectangle (e.g., a triangle, a circle, or the like). A preferred, but not required, objective of the smokescreen is to reduce the algorithm's confidence that that particular section of the image is a plate (i.e., to change the features in the dataset to be different than the features expected by the system). Such smokescreen can be optimized in its design and application to the vehicle to minimize the success of the object recognition software that powers the ALPR system.

With continued reference to FIG. 1, instead of the smokescreen or together with the smokescreen, system 10 may include a decoy 14. In an implementation, the decoy may be a device that is designed to mimic the features (decoy features) of the target (in this example, a license plate) more than the target object itself (especially when a smokescreen is utilized). In some implementations, the decoy may be a sticker, made to have the same size of a plate, of similar colors, and placed in an opportune area to maximize visibility and readability. Some implementations may equip such decoy with additional features that may make it supersalient for the ALPR algorithm (for instance, by adding a high contrast border so this decoy plate "pops" as much as possible against the background color of the car.) In some implementations, the decoy may include specific decoy information meant to inject specific data in the captured dataset. For example, in the context of ALPRs, the decoy information may be the value NULL—as such value may be used by certain recognition systems to label unreadable plates. In this example, the successful injection of the NULL value in the plate reading database associated with certain images or footage may encourage the recognition to discard such images or footage, or at least to assign such footage to a set of data that needs to be manually verified by a human, thereby defeating the mass automated collection of data. In some implementations, the decoy information may be placed on or both sides of the real information to create a longer string and thereby inject information into the captured dataset that is longer than expected by the system, or is read in a truncated form to match the expected length, hence reducing the reading accuracy In some implementations, the decoy information may employ characteristics that are similar in nature to the characteristics of the information expected by the system. As an example, the decoy information may have one, some, or all of the following: similar font, similar character spacing, similar character color, similar layout, and the like.

Implementations of Thwarters in the context of the license plate system will now be described. As discussed above, in an implementation, a Thwarter processes the information in the dataset to (i) identify features therein that are generally equivalent in size as, or larger than, features expected by the recognition system (e.g., the size of the license plate), and (iii) further process such identified features to ascertain any potentially identifying information that may be contained in any such identified features. Referring then to FIG. 1, Thwarter will identify smokescreen 12 and decoy feature 14 among other potential feature (e.g., perhaps the back window and any other feature that is larger than a license plate.)

To simply repeat the disclosure above, in an implementation, the Thwarter may comprise the step of removing features in the set of the identified features that are likely to be decoy features (and that may contain decoy information.) As an example, the Thwarter may review the features in the set of the identified features to locate potentially identifying information contained therein and comparing that information against information that is known to the system as decoy information (e.g., the system may be programmed to eliminate features that include NULL.) In some implementations, the Thwarter may compare the characteristics of the information contained in the dataset against the characteristics of the information expected by the system. For example, the system may eliminate features that include text that has a font different than the font used on a proper license plate and/or it may eliminate features that include characters that are spaced apart differently than the spacing on a proper license plate.

In another implementation, the Thwarter may comprise the step of identifying features in the set of identified features that contain information and processing that information to reveal whether such information might be potentially identifying information. As just described, the Thwarter may review the features in the set of the identified features to locate potentially identifying information (NULL and ASDFJKL) contained therein and comparing that information against information that is more likely to be potentially identifying information. For example, the system may make this determination based on a comparison of such information with information in other features in the set of the identified features and/or the system may make this determination by comparing such information against a set of information that is flagged by the system. For example, the set of information that is flagged by the system may be a list maintained by the system in which the system seeks.

Further examples of further processing in this context include: (i) identifying information contained in features that is more likely to be associated with the real plate based on historical or third party information (for instance, if a plate is registered locally, it is more likely, or if you had multiple readings of that plate then it is more likely); or (ii) processing the potentially identified information to review such information for certain character size, font (e.g. needs to be all CAPS), color, or text structure that is indicative of a real plate.

As described above, the desired information may be nested in decoy information that appears on one or both sides of the license plate. In some implementations, the thwarter may take in all such identified information and process it to identify whether any iteration of such identified information contains expected information. In some implementation, this kind of processing can be facilitated by comparing iterations of the identified information by comparing each iteration against a database of known values. In some implementations, this can be further accomplished by parsing the identified information into subsets of the information (e.g., truncated) and identifying whether such combinations exist in a database of known values and iterating through various formatives of such subsets.

Tattoo Embodiment

Examples of applying the systems and methods for preventing a recognition system from identifying one or more features contained in a dataset that are associated with potentially identifying information will now be described in the context of tattoo identification. As discussed above, tattoos are simply yet another one of many examples in which the inventive systems and methods can be employed and it is to be understood that the inventive systems and methods described herein can be used for a number of distinguishing features that can be associated with one or more persons.

Tattoos can be used to identify one or more individuals (potentially identifying information) that have a particular tattoo (features expected by the system). Taking the principles described above, one or both of the smokescreen and decoy may be implemented to prevent a recognition system from identifying the particular tattoo. In an implementation, the decoy may employ materials (sticker, makeup, or the like) that modify features of the tattoo (such as, for example, the color, pattern, or other features of the tattoo) so that when it is located by a recognition system it injects features into the dataset that are different than the features expected by the system. In some implementation, and as additional examples, the decoy may employ materials or methods that alter the tattoo under different light orientations or conditions (such as, for example, a hologram or infrared-sensitive pigments) so that the same person, observed under different point of views, under different lighting conditions, or using different information collection mechanisms will appear to have different tattoos and markings in the context of an automated recognition system.

Similar to the example of a license plate, Thwarters may be applied in the context of tattoos as well. In some implementations, the Thwarter may remove features in the set of identified features to eliminate those features associated with common tattoos or tattoos that are known by the system to be used as decoys.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, e-ink, projection systems, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for a recognition system to identify potentially identifying information that is contained within a dataset representing a system target comprising:
   receiving the dataset;
   identifying features in the received dataset that have a characteristic indicative of an expected feature, wherein one or more features within the identified features are decoy features having a decoy characteristic similar to the characteristic indicative of an expected feature;
   the decoy feature configured to mimic one or more expected features of the system target; and
   processing the identified features to yield a candidate feature, wherein the candidate feature is one feature contained among the identified features that has the highest probability of containing potentially identifying information, the candidate feature distinct from the one or more decoy features.

2. A method for a recognition system as set forth in claim 1, wherein the characteristic indicative of an expected feature is selected from the group consisting of one or more of the following: (i) whether the size of the feature is at generally the same size or a greater size than an expected features, (ii) whether the geometry of the features is generally consistent with the expected features, and (iii) whether the color of the features is generally consistent with the expected features.

3. A method for a recognition system as set forth in claim 1, wherein the processing step comprises:
   removing the one or more decoy features within the identified features.

4. A method for a recognition system as set forth in claim 3, wherein the removing step comprises:
   processing the features within the identified features to identify any information contained therein and processing any such information to reveal whether such information might be potentially identifying information.

5. A method for a recognition system as set forth in claim 4, wherein the processing step includes the step of comparing the identified information with information in a pre-populated dataset that is pre-populated by the system.

6. A method for a recognition system as set forth in claim 5, wherein the pre-populated dataset contains information that is flagged by the system such that the system identifies the feature associated with the information as the candidate feature if such information of a feature matches information in the pre-populated dataset.

7. A method for a recognition system as set forth in claim 5, wherein the pre-populated dataset contains information that is known by the system as decoy information such that the system removes the feature associated with the information from the set of identified features if such information of a features matches information in the pre-populated dataset.

8. A method as set forth in claim 1, wherein the system target includes a smokescreen that is included in the identified features.

9. A method as set forth in claim 1, wherein the potentially identifying information is a license plate number and the features expected by the recognition system are associated with the shape of a license plate having the license plate number.

10. A method as set forth in claim 1, wherein the potentially identifying information is one or more persons, the features expected by the recognition system are associated with one or more tattoos.

\* \* \* \* \*